United States Patent [19]
Abdelmalek

[11] Patent Number: 5,327,987
[45] Date of Patent: Jul. 12, 1994

[54] HIGH EFFICIENCY HYBRID CAR WITH GASOLINE ENGINE, AND ELECTRIC BATTERY POWERED MOTOR

[76] Inventor: Fawzy T. Abdelmalek, 12807 Willowyck Dr., St. Louis, Mo. 63146

[21] Appl. No.: 887,876

[22] Filed: May 26, 1992

Related U.S. Application Data

[63] Continuation-in-part of Ser. No. 862,502, Apr. 2, 1992.

[51] Int. Cl.$^5$ .......................... B60K 6/04; F01K 23/10
[52] U.S. Cl. ...................... 180/65.2; 60/618; 180/65.4
[58] Field of Search ................ 60/618; 180/65.2, 65.4

[56] References Cited

U.S. PATENT DOCUMENTS

| | | | |
|---|---|---|---|
| 4,031,705 | 6/1977 | Berg | 60/618 |
| 4,042,056 | 8/1977 | Horwinski | 180/65.2 |
| 4,180,138 | 12/1979 | Shea | 180/65.2 |
| 4,405,029 | 9/1983 | Hunt | 60/618 |
| 4,923,025 | 5/1990 | Ellers | 180/65.2 |
| 4,996,845 | 3/1991 | Kim | 60/618 |
| 5,249,637 | 10/1993 | Heidl et al. | 180/65.2 |

FOREIGN PATENT DOCUMENTS

2459886 1/1981 France .................. 60/618

*Primary Examiner*—Michael Koczo
*Attorney, Agent, or Firm*—Veo Peoples

[57] ABSTRACT

A hybrid-propulsion car system having one axle driven by an internal combustion engine and another axis driven by an electric motor. The waste heat of the internal combustion engine is absorbed by the engine cooling fluid, and is then heat exchanged with an evaporative fluid in a closed circuit. The evaporative fluid is vaporized by the heat of the engine cooling fluid in order to drive an expander which in turn drives an electric generator. The electric generator supplies current to a storage battery and to the electric motor.

6 Claims, 6 Drawing Sheets

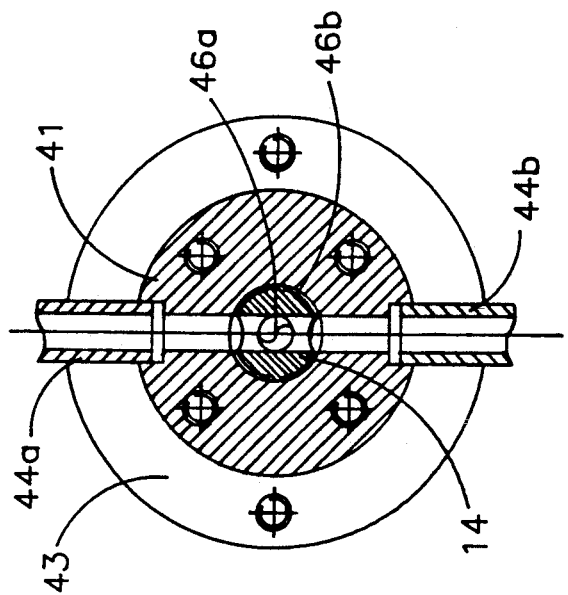
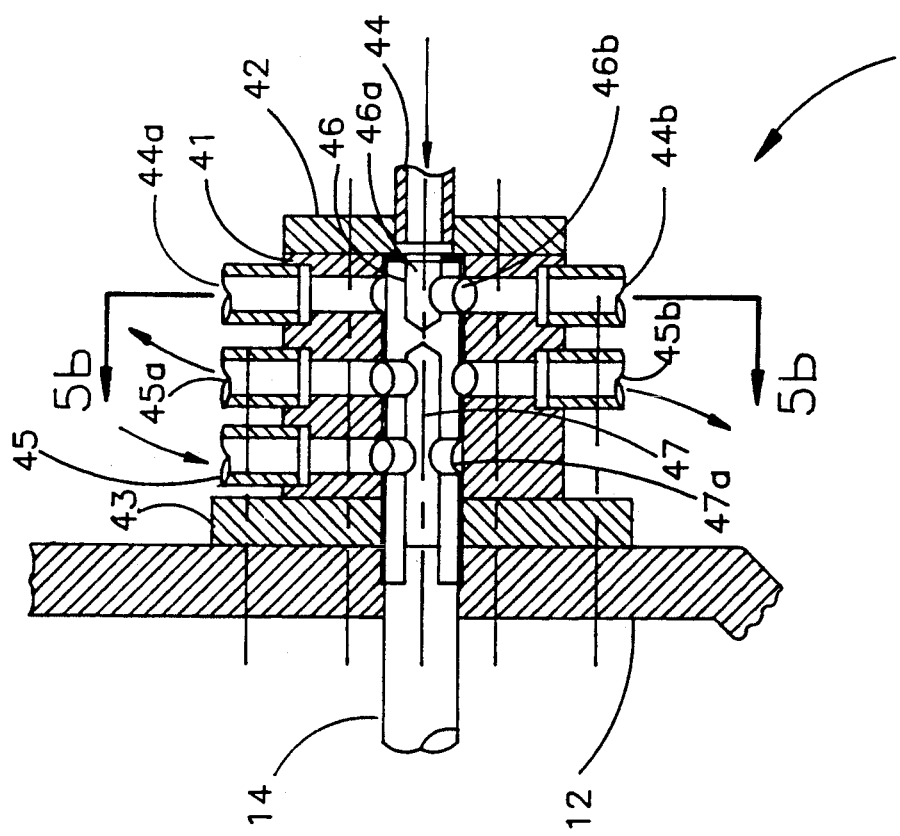
FIGURE 5b
FIGURE 5a

HIGH EFFICIENCY HYBRID CAR WITH GASOLINE ENGINE, AND ELECTRIC BATTERY POWERED MOTOR

RELATIONSHIP TO OTHER PENDING APPLICATIONS

This application constitutes a continuation-in-part of my co-pending application Ser. No. 07/862,502 filed Apr. 02, 1992.

BACKGROUND OF THE INVENTION

1. Field of the Invention

The present invention relates generally to a hybrid car having an internal combustion engine, and a battery powered electric drive motor, and having a system which recovers the heat energy usually rejected to the atmosphere from the internal combustion heat cycle, and recovers the kinetic energy from relative movements between the vehicle wheels and the chassis frame which is usually damped in the shock absorbers, to produce useful electric power for storage in an electric battery, and to operate the vehicle's electric drive motors.

2. Description of Prior Art

The continuing increases in the cost of fossil fuel, and the increased environmental concerns have forced global attention on a variety of energy-conserving, and energy-generating technologies which were previously difficult to be economically justified. The major automotive manufacturers in the U.S.A., and in Japan, had aggressive programs for developing new advanced electric driven vehicles having higher efficiencies, and improved electric batteries.

In the past, many extensive attempts have been made to achieve potential fuel consumption savings for gasoline and diesel fueled vehicles through use of methods to recapture the waste heat energy usually rejected into the atmosphere from the engine cooling fluid, and from the hot exhaust gas stream. Many other attempts were also made to recover the waste kinetic energy usually dissipated in the shock absorbers.

U.S. Pat. No. 4,570,077 disclosed a system where a gas turbine is actuated by recovering the heat from the exhaust gas stream. U.S. Pat. No. 4,342,200, and U.S. Pat. No. 4,164,850 disclosed systems utilizing evaporative fluid for cooling the engine block, and utilizing the recovered heat to operate an air conditioning system using ejector means for compression. U.S. Pat. No. 4,120,157 disclosed a system for power generating and air conditioning utilizing waste heat from an internal combustion engine to heat and pressurize gas working fluid employed for a power cycle. U.S. Pat. No. 3,554,849 disclosed a system utilizing an evaporative fluid to recover waste heat from the engine lubricating oil and from the hot exhaust gas stream. Many other systems were invented to generate power by capturing and utilizing the physical relative movements of the vehicle wheels and chassis frame. U.S. Pat. No. 3,981,204 disclosed a shock absorber using rack and pinion gear assembly to drive electric generators, U.S. Pat. No. 4,387,781 disclosed an electric generating system utilizing the relative movements of the vehicle frame, and U.S. Pat. No. 4,381,041 disclosed another electric power generating system utilizing the superfluous movements of the vehicle. However, none of the above prior art attempts, individually or collectively, proposed the system and embodiments indicated and disclosed by the present invention.

It is, therefore, a principle object of the present invention to increase the fuel economy of gasoline or diesel fueled vehicles.

It is further a principle object of the present invention to provide an energy recovery system for a hybrid car which has both internal combustion engine, and battery driven electric motor drive.

It is further a principle object of the present invention to utilize the waste low temperature heat usually rejected in the engine cooling fluid, and in the exhaust gas stream to generate useful electric power.

It is further an object of the present invention to utilize the relative mechanical movements between the vehicle wheels and chassis frame which is usually absorbed by the shock absorbers, to generate useful electric power.

It is further an object of the present invention to provide a high efficiency hybrid automotive vehicle system having manual and automatic operating controls to allow selection of the drive for the best possible operating efficiency at either high speed long range highway driving, or at low speed intermittent city driving.

It is further an object of the present invention to provide an automotive vehicle system which conserves energy, and reduces the vehicle's potential environmental impact.

The invented hybrid car system provides a solution for the shortcomings of the electric driven car, more specifically, the limited storage capacity of the electric battery, short battery life, short driving range, and low speed and torque output. Also, providing a solution for the shortcomings of the gasoline or diesel fueled vehicles, more specifically, the increased fuel consumption, and increased exhaust gas emissions at idle and low speed operating conditions.

These objects and others which will become apparent from the following detailed descriptions and drawings are fulfilled by incorporating a heat exchange system to recover waste heat energy from the engine cooling fluid, and from the engine exhaust gas stream, and by utilizing the waste kinetic energy usually absorbed by the shock absorbers, to operate a hermetically sealed gas expander-electric generator unit, and to produce useful electric power for charging a battery and driving the vehicle.

While the present invention has particular usefulness in connection with an automotive vehicle, the invented system can be employed with other gasoline or diesel fueled internal combustion engines for many applications, including passenger cars, buses, trucks, marine vessels, and stationary power generating engines. The invented electric power generating system may be added to an existing installation, without the need to modify the basic design of the internal combustion engine.

SUMMARY OF THE INVENTION

In accordance with the present invention, a hybrid car has both internal combustion engine and electric battery powered motor drive, and has an electric power generating system utilizing waste heat energy from the internal combustion engine, and waste kinetic energy from the shock absorbers. The invented hybrid car system will achieve approximately up to 25% reduction in fuel use through recovery of waste heat energy from the internal combustion engine, and approximately up to 15% reduction in fuel use through recovery of waste kinetic energy from the shock absorbers. Depending on the ambient temperatures and operating conditions, fuel savings in the range of 30% to 40% can be achieved when compared to a conventional gasoline or diesel fueled vehicles.

SUMMARY OF THE DRAWINGS

FIG. 5a is a sectional view of a rotary distribution valve for use with the reciprocating piston gas expander FIG. 5b is a sectional view of FIG. 5c, along Line 5b—5b.

DETAILED DESCRIPTION OF THE PRESENT INVENTION

Figure 1:
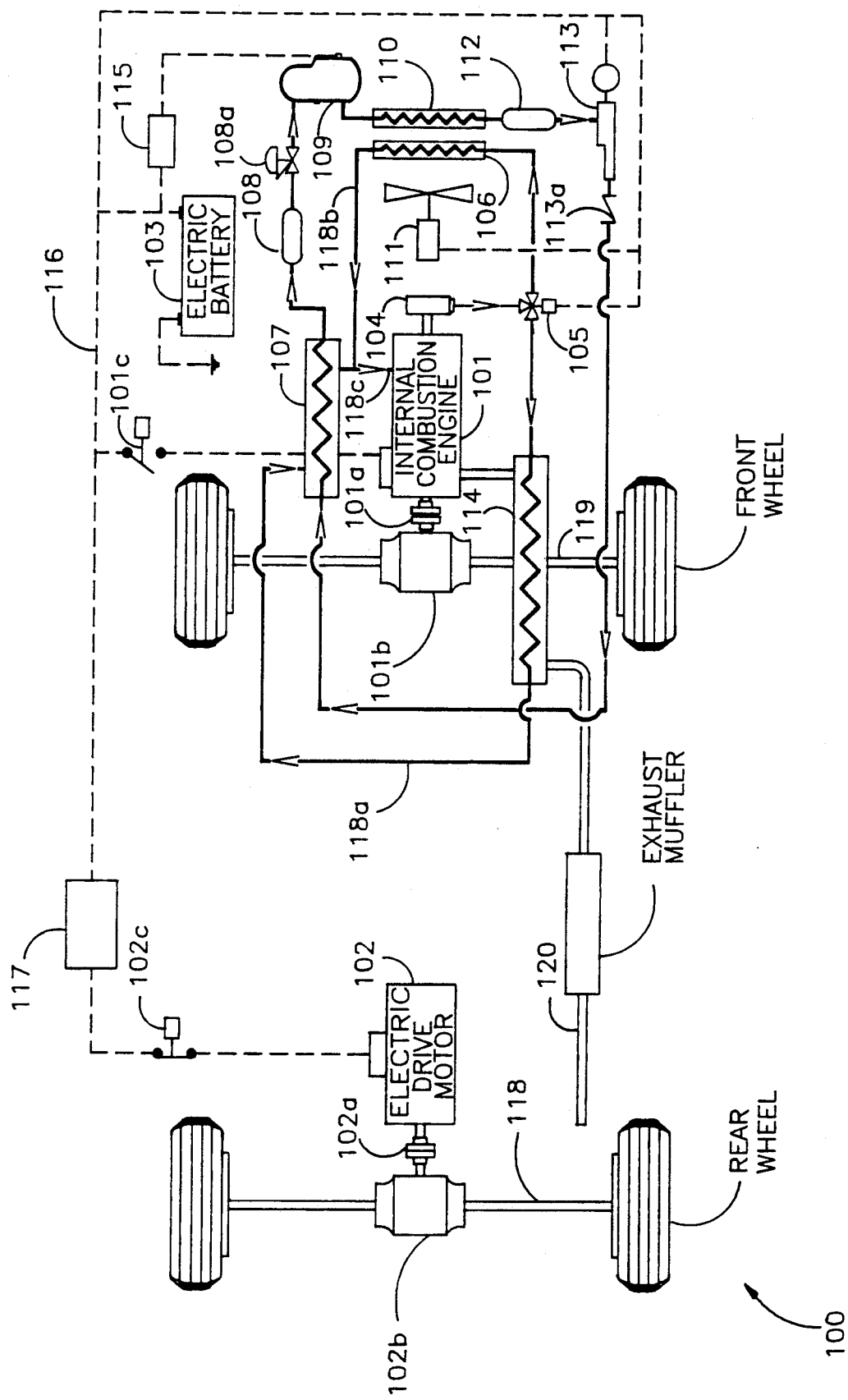
FIG. 1 is a schematic drawing for an energy recovery and energy generating system for a high efficiency hybrid car with internal combustion engine, and battery driven motor drive.

In the present invention a heat exchanger is employed to recover waste heat energy from an internal combustion engine, to heat and evaporate a pressurized power fluid, while the engine cooling fluid is cooled, the pressurized power fluid is heated and evaporated, the relatively high pressure vapor is then allowed to expand in a positive displacement gas expander device. The gas expander has a common power shaft which is directly connected to drive the rotor of a direct current electric generator. The thermal energy of the power fluid is removed in the form of "work"; (1) provides kinetic energy needed to drive the rotor of the electric generator, and produce electric power; (2) partly provides cooling effect for the circulating cooling fluid of the internal combustion engine. The expanded vapor exiting the gas expander enters a condenser, where its latent heat is rejected to the atmosphere, and the vapor condenses to liquid. The liquefied power fluid is then returned back by a liquid pump to the high pressure side of the power circuit. A one way non return valve is placed in the high pressure liquid discharge line to prevent reverse flow. The internal combustion engine cooling fluid pump may be directly driven by the engine shaft, or may be driven with a separate electric powered motor. The relatively warm cooling fluid flowing from the engine jacket is directed to a three way temperature modulating control valve to divide the flow into a main stream and a side stream. The main stream is directed to flow through an exhaust gas heat exchanger, while the exhaust gas stream is cooled, the cooling fluid is further heated to a higher temperature level before entering the power fluid evaporator. The side stream is directed to flow through an air cooled radiator. The cooled mainstream fluid flowing from the power fluid evaporator heat exchanger, and the cooled sidestream fluid flowing from the air cooled radiator are then combined before entering the engine cooling jacket.

The three way temperature controlled flow modulating valve provides the correct flow rates of the engine cooling fluid through the evaporator and the radiator to maintain the desired temperature for the evaporation of the power fluid, and to prevent engine overheat conditions.

Another part of the present invention, utilizes the relative movements between the vehicle wheels and chassis frame, which is usually damped in the shock absorbers, to pressurize a power fluid and operate a power expander. The embodiments and structures of this part are disclosed in my patent application number 862,502 entitled "Shock Absorber System and Apparatus for Vibration Damping and Electric Power Generation".

A voltage regulator is placed in the electric circuit, between the electric generator, and the electric storage battery. The electric power produced may be transmitted directly for use through a solid state programmable logic controller which controls the speed of the vehicle electric drive motor. The controller has an electronic processor which continually receives, and evaluates analog electric voltage signals proportional to the battery charge, and the vehicle speed. The controller produces a digital signal to affect selection, start, or stop either drive. The controller includes a solid state inverter to convert the direct current to a variable cycle alternating current to control the speed of the vehicle drive motor. A manual selector switch allows the vehicle operator to make his selection of the primary drive for start-up and moving the vehicle from rest position. The solid state controller automatically switches between the two drives while the vehicle is in operation, if the vehicle speed reaches a certain high limit, or if the electric battery charge drops to a certain low limit, the controller will automatically start-up and engage the gasoline engine drive, and simultaneously electrically disconnect and mechanically disengage the electric motor drive. A time delay feature will prevent excessive switching between the two drives for sudden slow down or speed up of the vehicle.

A number of refrigerants, including, for example, freon R-22 and refrigerant 717 (ammonia), may be employed in the present invention. The new Clean Air Act has regulated production and use of all types of refrigerants which contain chlorofluorocarbon (CFC), including R-11, R-12, R-500, and the hydrogenated chlorofluorocarbon (HCFC) chemicals which include R-22. Although the production of these refrigerants shall be banned by year 2000, new refrigerant products have been developed. Provided such new products prove to be safe, nonflammable, nontoxic and meet the new Clean Air Act limit requirements for the Ozone Depletion Potential (ODP), the Greenhouse Warming Potential (GWP), and the Allowable Exposure Level (AEL), they may be employed in the present invention.

Refrigerant HCFC 123, developed for low pressure refrigeration systems replaces R-11, and refrigerant HCFC-134A for medium pressure refrigeration systems, replaces R-12. These and other products which have been certified by the Air Conditioning and Refrigeration Institute and by the Environmental Protection Agency, may be employed in the present invention. For the purposes of this invention, the hermetically sealed gas expander can be of other dynamic or reciprocating types.

OPERATION

Figure 3:
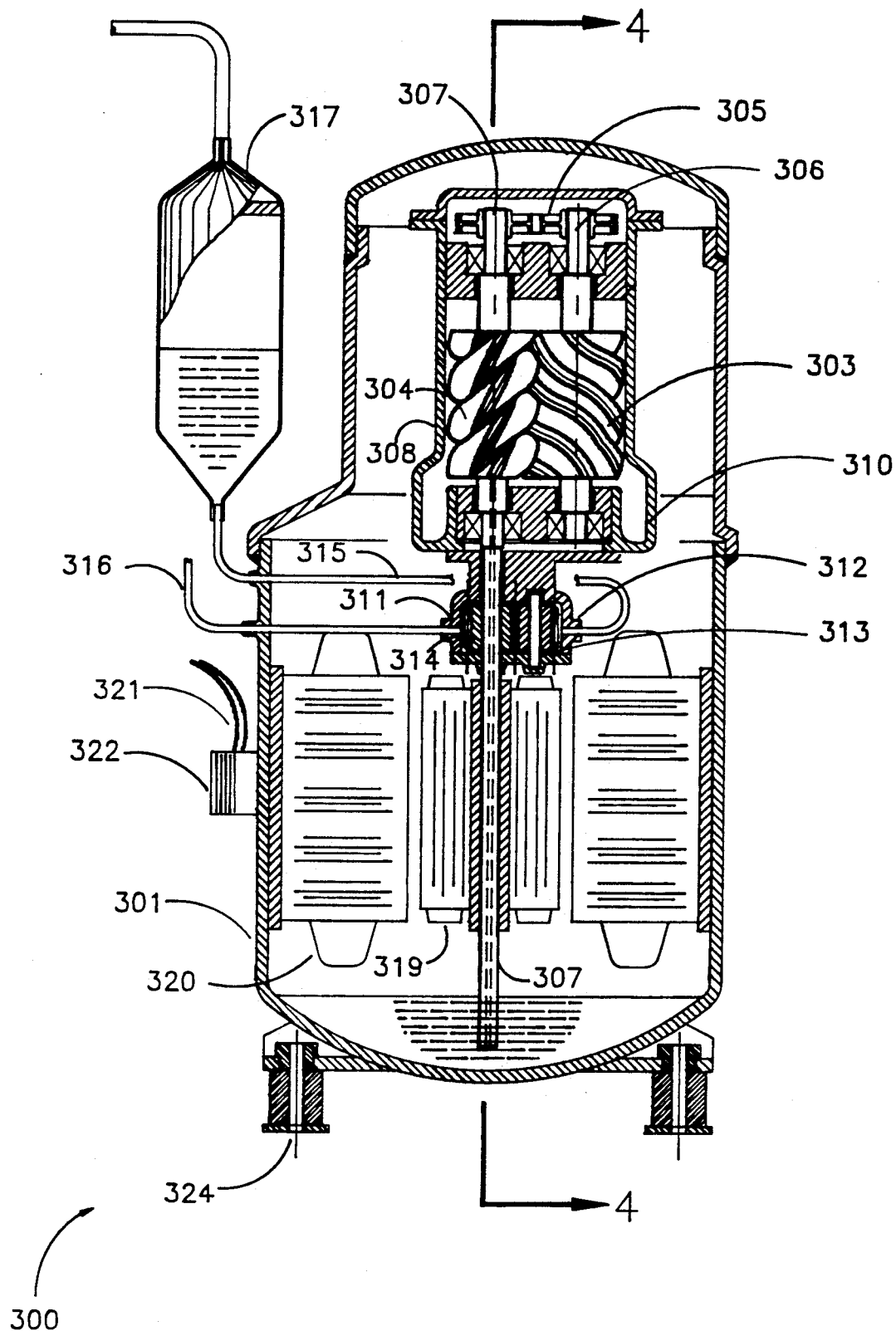
FIG. 3 is a longitudinal sectional view of a hermetically sealed helical screw gas expander-electric generator unit.
Figure 4:
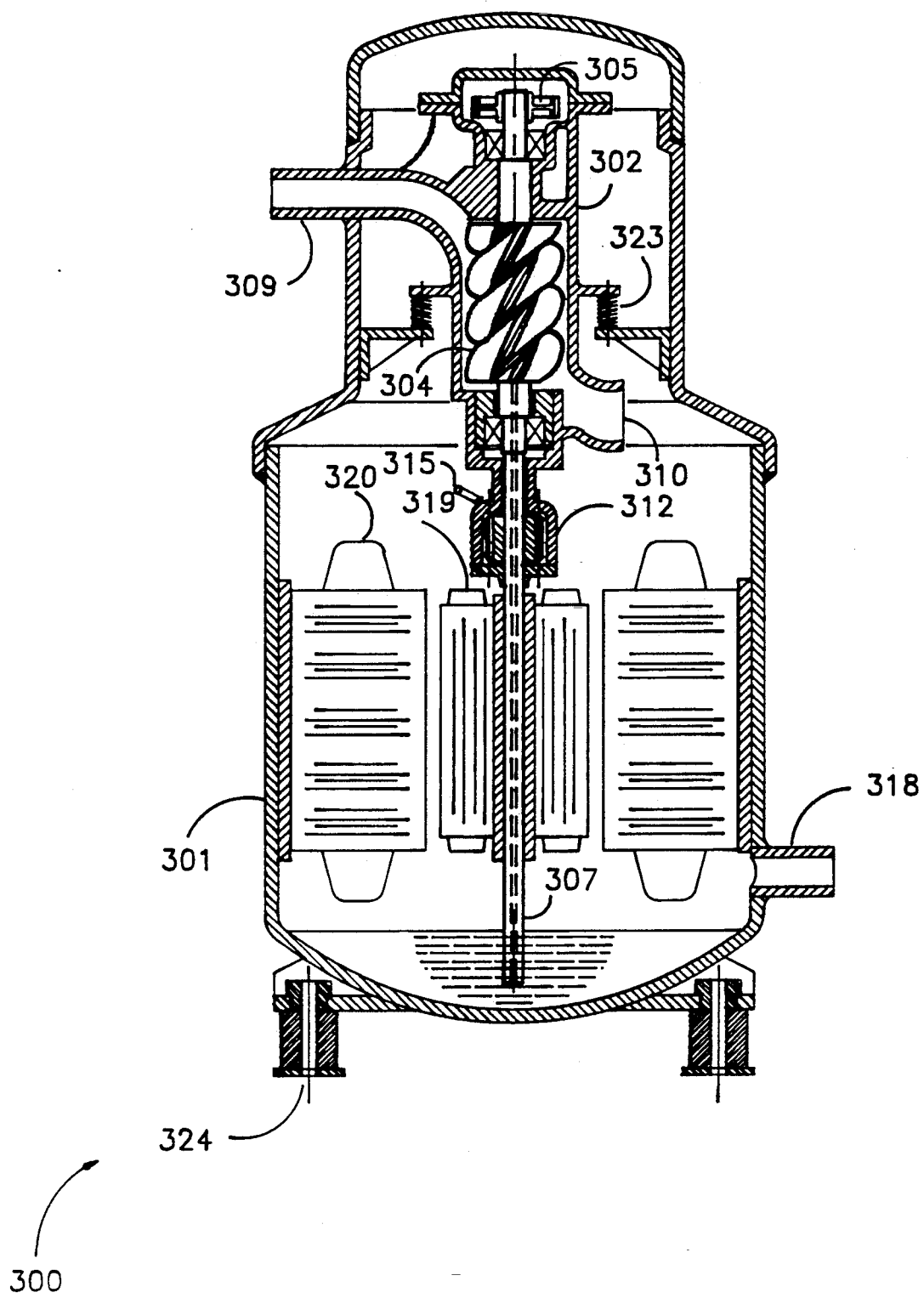
FIG. 4 is a longitudinal sectional view along line 4—4 of FIG. 3.

In FIG. 1, the invented high efficiency hybrid car system 100, having an internal combustion engine 101 with its power shaft interconnected to a clutch 101a which transmits power to a front wheel axle drive 101b, an electric motor 102 with its power shaft interconnected to a clutch 102a to transmit power to a rear wheel axle drive 102b, an electric power battery 103, a waste heat energy recovery, and an electric power generating system. The waste heat recovery, and electric power generation system consists of a gas expander-electric generator power unit 109 employed to produce useful electric power for transmission and storage in an electric battery 103. The cooling fluid of the internal combustion engine, water with antifreeze additive, or alike, circulates through the engine block 101 to remove the residual heat of the combustion and the heat of friction. While the engine block is cooled, the circulating cooling fluid is heated. The circulating pump 104, shown directly connected to the engine shaft, may be indirectly powered by an electric motor. The relatively hot fluid flowing from the discharge of pump 104 is directed to flow through a three-way temperature controlled flow valve 105, which divides the flow into a mainstream and a sidestream. The mainstream flow of the cooling fluid is directed to flow through an exhaust gas heat exchanger 114, while the exhaust gases are cooled, the circulating fluid is further heated to a higher temperature level. The relatively high temperature fluid flowing from the exhaust gases heat exchanger is then directed in conduit 118a to exchange heat in an evaporator heat exchanger 107, while the cooling fluid is cooled, the power fluid is heated and evaporated. The side stream flow of the cooling fluid is directed to enter an air cooled radiator 106, where the cooling fluid is cooled, and then circulated back in conduit 118b to be combined with the cooled mainstream flowing from the evaporator 107 in conduit 118c before entering the engine block 101. The control valve 105 is of a temperature controlled modulating type to affect flow rate adjustment, maintain a desired temperature level of the cooling fluid in the engine block 101, and maintain the temperature level required to evaporate and superheat the power fluid in the evaporator 107. Evaporator 107 is a heat exchanger of shell and tube or of plate type construction, and is sized to exchange heat between the engine cooling fluid and the power fluid. While the engine cooling fluid is cooled, the power fluid is heated and evaporated. The relatively high pressure vapor of the power fluid is then directed to an accumulator 108, then is released through a pressure regulating valve 108a to enter a hermetically sealed gas expander-electric generator unit 109, where the power vapor undergoes an isentropic expansion process through the expander unit to a relatively lower pressure and lower temperature. The potential and thermal energy of the expanding power fluid is converted to kinetic energy to actuate the gas expander rotor, and drive the power shaft of a direct current electric generator. The expanded relatively lower pressure, relatively lower temperature vapor is then directed to enter a condenser 110, an electric driven fan 111 is used to force ambient air through both of the vapor condenser 110, and the cooling fluid radiator 106. The relatively low pressure power fluid condensate flowing from the condenser 110 is then conducted to enter a liquid filter-receiver 112. A hermetically sealed positive displacement pump 113 has a non return discharge valve 113a is employed to pressurize the condensate of the power fluid to the high pressure side of the power circuit back to the evaporator 107. The positive displacement pump 113 is preferred to be hermetically sealed, and to be directly fitted on the common power shaft of the expander as indicated in FIG. 3 and FIG. 4. A solid state voltage regulator 115 is employed to regulate the voltage of the direct current electricity generated and transmitted in the wiring 116. Alternating electric motor 102 is connected by wiring 116 to the electric storage battery 103 through a control unit 117. Control unit 117 has an inverter for speed control, and when set in a first mode it connects and regulates the speed of the electric motor 102, actuates the clutch 102a to the engage position, and simultaneously actuating clutch 101a to the disengage position. When the control unit is set to a second mode, it disconnects the electric motor 102, actuates the clutch 102a to the disengage position, and simultaneously actuating a relay 101c to the close position so as to electrically start the internal combustion engine 101, and the clutch 101a to the engage position. Controller 117 is of solid state programmable type processor that permits selection of the best mode of operation, by receiving, measuring, and evaluating analog signals which vary with the speed of the vehicle, and the battery charge level, and has a time delay feature to prevent excessive switching between the two modes while the vehicle is in operation. The electric starter of the internal combustion engine 101, and the electric drive motor 102 are each independently actuated by the control unit 117, so that when the control unit 117 is set to the ELECTRIC mode, as shown in FIG. 1, relay 101c is closed, clutch 101a is engaged to link the electric motor shaft to the rear wheel axle drive 101b so that motor 101 rotates the rear wheel axle 118, and sets the clutch 101a in idle position to disengage the internal combustion engine gear drive from the front wheel axle 119, and to open the relay 101c to disconnect the internal combustion engine 101 from battery 103. Alternatively, when the control unit 117 is set to FUEL mode, clutch 102a is disengaged to the idle position, and clutch 101a is engaged to link the internal combustion power shaft to drive the front wheel axle 119, it switches logic control circuits to close relay 101c and connect the electric starter of the internal combustion engine, to open relay 107c and disconnect the electric motor 102 from battery 103, and to start and engage the internal combustion engine 101. A voltage sensor, fitted in the electric circuit, transmits a signal when the battery charge or voltage drops below a desired limit, a speed sensor is also fitted with internal means to transmit analog electric signals, when the vehicle reaches a predetermined high limit, it opens relay 102c to disconnect the electric motor 102 from battery 103, and to close relay 101c to start and engage the internal combustion engine 101. The exhaust gas heat exchanger 114 must be constructed of corrosion resistant materials to withstand the condensate of the acidic vapors emitted in the exhaust gas stream.

Figure 2:
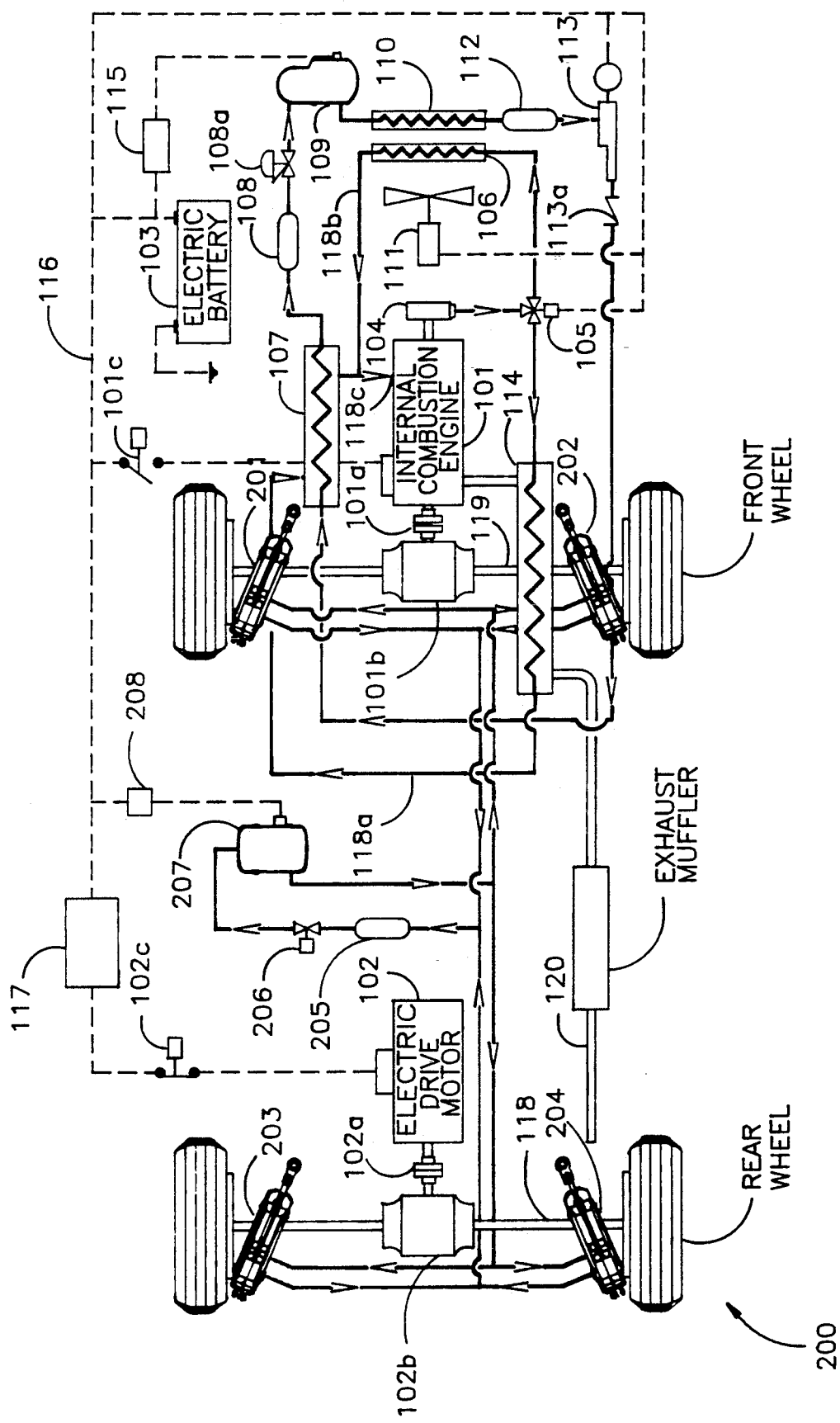
FIG. 2 is a schematic drawing for the invented system with an embodiment to recover the waste mechanical energy of vibration damping in the shock absorbers.

In FIG. 2 system 200 indicates another embodiment of the present invention to recover the waste kinetic energy from shock absorbers 201, 202, 203, and 204. The shock absorbers are utilized to pump the power fluid to recover the kinetic energy from the road shocks, and from other relative movements between the vehicle wheels and the chassis. The shock absorbers energy recovery system, and structures are similar to that disclosed in my patent application Ser. No. 862,502. In summary, the shock absorbers allow one direction flow of the power fluid through the shock absorber pistons to affect damping the vertical movements of the vehicle's frame while pressurizing the power fluid. The relatively high pressure power fluid flowing from the shock absorber discharge is directed to a pressure accumulator 205, then is released through a pressure regulating valve 206 to actuate a power expander-electric generator unit 207. An electric voltage regulator 208 is placed in the electric circuit to maintain the desired voltage of the electric power produced for storage in battery 103, or for immediate use to drive motor 102, or for other electric uses.

FIG. 3 and FIG. 4 indicate longitudinal sections of a hermetically sealed positive displacement helical screw gas expander-electric power generating unit 300 having an enclosure 301 assembled of two or more welded parts. The enclosure contains a helical screw type gas expander assembly which consists of two intermeshing female helical screw driver rotor 303, and a male helical screw driven rotor 304. A spur type gear drive 305, or other means may be used to transmit the kinetic energy from the driver female rotor shaft 306, and the driven male rotor shaft 307. The male rotor shaft 307 extends outside the expander metal disclosure 308, which has a relatively high pressure gas intake 309, and a relatively low pressure gas discharge 310. In operation, the high pressure gas enters from the high pressure intake 309 in a lobe of the female rotor, the gas forces and unmeshes the male rotor from the female rotor creating a void, and the gas progressively expands tangentially, and circumferentially around the expander housing 302 causing rotation of the rotors 306 and 307. The gas expands in the direction of the discharge port 310. Thus the volume of high pressure pocket of gas trapped within the inner lobe space at the intake port, continuously increased, and the gas pressure consequently decreased in axial direction towards the discharge port. A liquid positive displacement pump assembly is fitted on the power shaft 307, and has an enclosure assembly which contains two meshing helical gears 313 and 314. The liquid pump enclosure, has a relatively low pressure intake 312, and a relatively high pressure discharge 311. The pump discharge and suction are piped to outside the hermetic enclosure 301. The pump discharge conduit 316 is connected to the evaporator (not shown), and the pump suction conduit is connected to a liquid filter receiver 317. The common power shaft 307 extends through the liquid pump casing, and it's end is submerged in a lubricating oil reservoir contained in the bottom of the helically sealed enclosure. The drive shaft has a hollow core with helical oil passage to allow pumping lubricating oil from the oil reservoir up to the expander rotors. A direct current, brushless, solid state commutated electric generator assembly is disposed inside the hermetically sealed enclosure 301, and has its magnetic rotor 319 directly installed on the extended power shaft 307. The electric power generated in the winding of the stator 320 is transmitted through a hermetically sealed wire cable 321 through an electric terminal box 322. The relatively low pressure, relatively low temperature exhaust from the expander is used to provide cooling for the electric generator before being discharged from the enclosure 301 through outlet 318. Suspension assembly 323 supports the gas expander inside the unit enclosure 301. The unit enclosure 301 has vibration isolation support means 324 for installation in the vehicle frame. For purposes of simplicity of presenting the embodiments of the present gas expander-electric generator unit, well known prior art details for the construction and operation of bearings, high pressure seals, lubrication, oil separation, filtering, etc., are not disclosed herein. Actually, a helical screw expander can be manufactured from the already designed, developed, and manufactured parts and assemblies of the well known helical screw compressors widely used in the refrigeration and air conditioning systems. The design and operating parameters of the helical screw compressors are well developed and understood, and the technology presents no particular manufacturing problems.

Although the invented hermetically sealed helical screw gas expander-electric generator unit is described in terms of the specified embodiments set forth in detail, it should be understood to those who are skilled in the art, that the invention is not necessarily limited thereto, since alternative embodiments and use of other operating fluids for converting gas thermal energy to kinetic energy may be employed, accordingly modifications for other arrangements of the components are contemplated, and obviously can be made without departing from the spirit of the described invention.

Figure 5:
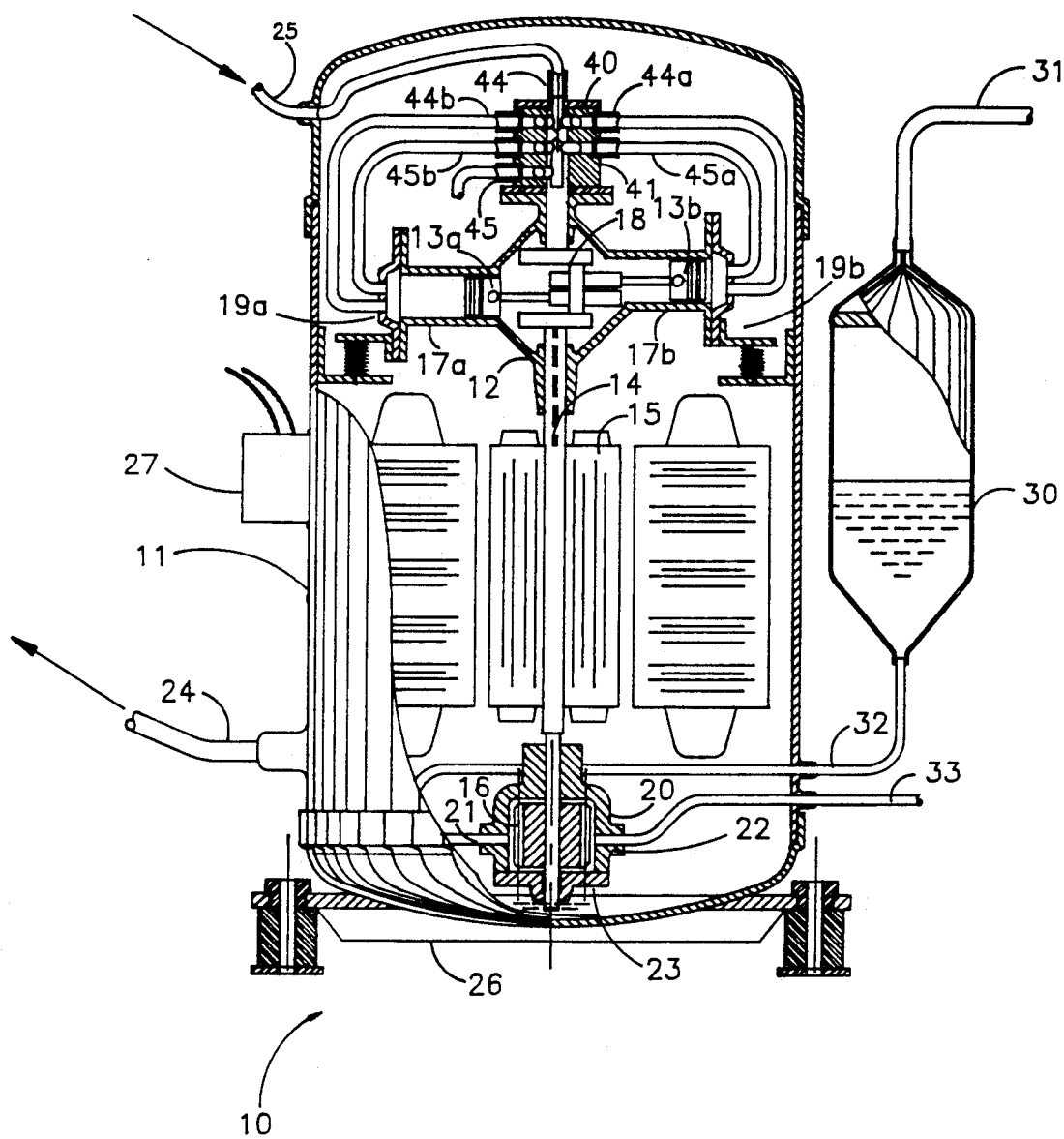
FIG. 5 is a longitudinal sectional view of a hermetically sealed reciprocating piston gas expander-electric generator unit.

FIG. 5 indicates a longitudinal section of a hermetically sealed reciprocating gas power expander-electric generating unit 10. The power generating unit 10 has a hermetically sealed enclosure 11, assembled of two or more welded parts. The enclosure 11 contains a reciprocating piston type gas expander mechanism 12, having pistons 13a, and 13b, which are operatively connected to a power shaft assembly 14. The power shaft 14 is firmly connected to rotor 15 of a permanent magnet brushless D.C. electric generator. The power shaft 14 is also connected to drive a power fluid liquid pump rotor 16. A rotary distribution valve 40 having a shaft stem which is operatively connected to the power shaft 14. The valve 40 has a relatively high pressure gas inlet 44, and a relatively low pressure gas outlet 45. Valve 40 operatively communicates with the respective cylinders 17a and 17b, to alternatively move the pistons 13a and 13b, to their respective inwardly and outwardly positions relative to the eccentric or crank pin assembly 18. The end of the cylinders 17a and 17b are closed with head assemblies 19a and 19b. The rotary distribution valve 40 cooperates with the position of the expander pistons to coordinate intake of the relatively high pressure power fluid at a point of time when a respective piston moves to its outmost position towards the cylinder head, and to allow exhaust of the expanded relatively low pressure gas at a point of time when the respective piston reaches its farthest inward position toward the drive shaft. A liquid pump assembly having a helical gear rotor 16 firmly mounted on the drive shaft 14, and having a sealed enclosure 20. The pump enclosure 20 has a relatively low pressure liquid intake connection 21, and a relatively high pressure liquid discharge connection 22. The pump intake 21 is connected to the outlet of a liquid filter/receiver 30 by a pipe 32; discharge 22 is connected to outside the enclosure 11 by pipe 33 for connection to the power fluid evaporator (not shown). The inlet of the filter/receiver 30 is connected to the condenser (not shown) by a pipe 31. The common power shaft 14 extends through the liquid pump casing, and it's end is submersed in a lubricating oil reservoir contained in the bottom of the hermetically sealed enclosure. The drive shaft has a hollow core with helical oil passage to allow pumping lubricating oil from the oil reservoir up to the expander pistons. The hermetically sealed enclosure 11 is mounted on vibration isolation support 26.

FIG. 5a and FIG. 5b indicate section and side view of a rotary valve 40 to be used in combination with the reciprocating piston expander unit 10. The rotary valve assembly consists of a valve distribution block 41, end plate 42, and base plate 43. The end plate 42 has a high pressure inlet 44, which is in communication with the valve connections 44a, and 44b which are radially located on the distribution block 41. A low pressure outlet 45 is in communication with the valve connections 45a and 45b which are also radially located on the distribution block 41. The valve shaft stem 46 is firmly connected to the expander shaft 14, and has a hollow portion 46a in communication with the high pressure outlets 44a and 44b through a groove 46b. When the expander shaft rotates, groove 47 lines alternatively with the high pressure connections 44a and 44b, it permits high pressure gas to be released alternatively to the expander cylinders, similarly, the outlet 45 is in communication with the connections 45a and 45b through center hole 47. When the expander shaft rotates, the groove 47a lines alternatively with the low pressure gas connection 45a and 45b, it permits low pressure gas to be exhausted. The distribution block 41, the end plate 42 and the base plate 43 are bolted to form one assembly. The base plate 43 is mounted and firmly secured to the expander casing.

It is understood that the drawings and details of the embodiments of the reciprocating piston expander and the rotary distribution valve are shown schematically, and for purpose of simplicity, the drawings do not indicate prior art means for seals, bearings, lubrication, and other details which are necessary for manufacture and operation. The reciprocating piston expander may be of single of multiple cylinders, the pistons may be arranged radially or along the axis of the drive shaft.

EXAMPLE

The following example is to demonstrate the merits of the present invention. It indicates a summary of estimated operating conditions and performance for a gasoline fueled engine producing 1 BHP (2552 BTU/hr) compared with the performance of a hybrid system using a waste heat driven ammonia vapor power system. It is understood that the presented information is based on certain particulars which may vary:

| I. GASOLINE ENGINE BLOCK COOLING | |
|---|---|
| a. Engine brake horsepower, BHP (BTU) | 1.0 (2552) |
| b. Specific fuel use, LB/BHP | 0.5 |
| c. Fuel heat value, BTU/LB | 19,000 |
| d. Fuel specific thermal energy, BTU/BHP | 9,500 |
| e. Air fuel ratio | 15:1 |
| f. Fuel-air mixture inlet temperature, °F. | 70 |
| g. Exhaust gas temperature, °F. | 1,000 |
| h. Engine cooling water inlet temp, °F. | 180 |
| i. Engine cooling water outlet temp, °F. | 200 |
| j. Engine heat removed by water, BTU/BHP | 3,800 |
| k. Cooling water mass flow rate, LB/BHP | 190 |
| II. GASOLINE ENGINE EXHAUST GAS COOLING/WATER HEATING HEAT EXCHANGER | |
| a. Exhaust gas inlet temp, °F. | 1,000 |
| b. Exhaust gas outlet temp, °F. | 120 |
| c. Exhaust gas heat removed by cooling water, BTU/BHP | 2,200 |
| d. Cooling water inlet temp, °F. | 200 |
| e. Cooling water outlet temp, °F. | 212 |
| III. AMMONIA EVAPORATOR/WATER COOLING HEAT EXCHANGER | |
| a. Cooling water inlet temp., °F. | 212 |
| b. Cooling water outlet temp., °F. | 180 |
| c. Heat absorbed by ammonia, BTU/BHP | 6,080 |
| d. Ammonia liquid inlet temp, °F. | 87 |
| e. Ammonia liquid inlet pressure, PSIA | 650 |
| f. Ammonia liquid inlet enthalpy, BTU/LB | 140 |
| g. Ammonia vapor outlet temp, °F. | 200 |
| h. Ammonia vapor outlet pressure, PSIA | 650 |
| i. Ammonia vapor outlet enthalpy, BTU/LB | 650 |
| j. Liquid ammonia heat absorbed, BTU/LB | 510 |
| k. Liquid Ammonia main flow, LB/BHP | 11.92 |
| IV. AMMONIA GAS EXPANDER | |
| a. Ammonia vapor inlet temp, °F. | 200 |
| b. Ammonia vapor inlet pressure, PSIA | 650 |
| c. Ammonia vapor inlet enthalpy, BTU/LB | 650 |
| d. Ammonia vapor outlet temp, °F. | 85 |
| e. Ammonia vapor outlet pressure, PSIA | 140 |
| f. Ammonia vapor outlet enthalpy, BTU/LB | 575 |
| g. Ammonia isentropic work done, BTU/LB | 75 |
| h. Ammonia isentropic work done, BTU/BHP | 894 |
| i. Expander shaft work @ 80% isentropic efficiency, BTU/BHP | 715 |
| j. Ammonia liquid pump work input, BTU/BHP | 60 |
| k. Electric generator network input, BTU/BHP | 655 |
| l. Electric generator net power output @ 85% generation & transmission, BTU/BHP | 557 |
| V. HYBRID SYSTEM PERFORMANCE | |
| a. Gasoline engine brake horsepower, BHP | 1.00 |
| b. Electric power generated for storage and use by the electric motor, HP/BHP | 0.22 |
| c. Hybrid system combined power, BHP | 1.22 |

The example indicates that the hybrid car system at the given working conditions, will achieve approximately 22% savings in fuel use, which is accomplished by recovery of waste heat otherwise emitted into the atmosphere. The efficiency of the ammonia power cycle and power produced by the ammonia gas expander will vary with the condensing temperature of the ammonia. The lower the ambient temperature, the lower the condensing temperature, and the higher the power produced by the gas expander. For example, if the condensing temperature drops to 40° F. (winter condition) the power generated, and savings in fuel use by the heat recovery system will increase up to 40%. The estimated savings by the shock absorber kinetic energy recovery system has been disclosed in detail in my previous patent application.

What is claimed is:

1. In combination with a hybrid car having an internal combustion engine for front wheel axle drive, and a battery powered motor for a rear wheel axle drive, wherein the improvement allows the waste heat energy usually rejected in the radiator, and the waste heat energy usually rejected in the exhaust gas stream, to be recovered and utilized to actuate a hermetically sealed gas expander having a common drive shaft driving a direct current electric generator, the improvement which comprises:

an internal combustion engine having recirculating cooling fluid jacket;

a liquid cooling fluid;

an internal combustion engine cooling fluid circulating pump;

a temperature controlled three-way flow control modulating valve;

a forced ambient air cooled radiator, having an electric motor driven fan;

a heat exchanger adapted to exchange heat between said internal combustion engine exhaust gas stream, and said engine cooling fluid, to effect cooling of said exhaust gas stream and heating of said engine cooling fluid;

means to interconnect said cooling fluid jacket, said circulating pump, said flow control valve, said cooling fluid air radiator, and said exhaust gas heat exchanger in a closed circuit;

an evaporative power fluid;

a heat exchanger adapted to exchange heat between said evaporative power fluid and said liquid cooling fluid;

a hermetically sealed gas expander assembly adapted to expand said power fluid vapor, said gas expander has a common power shaft to drive a D.C. electric generator adapted to produce electric power;

means for regulating the pressure of the relatively high pressure vapor of said power fluid flowing from said heat exchanger and directing it to the inlet of said hermetically sealed gas expander;

a condenser adapted to exchange heat energy between the expanded vapor of said power fluid, and the ambient cooling air to affect cooling and condensing said power fluid vapor;

means for directing the expanded vapor of said power fluid flowing from said expander outlet to said condenser inlet;

a liquid receiver;

a hermetically sealed liquid pump adapted to substantially pressurize the condensate of said power fluid;

a one way non-return valve;

means for directing the relatively low pressure vapor condensate of the power fluid flowing from said condenser into said liquid receiver, to the intake of said pump;

means for directing said pressurized vapor condensate of said power fluid flowing from said pump through said non-return valve to said heat exchanger, to substantially heat and evaporate said power fluid;

a direct current electric storage battery;

an electric volt regulator controller;

a solid state programmable control unit adapted to select and operate said internal combustion engine, or said electric motor drive for the best mode of operation, said controller accepts and evaluates the value of analog electric signals for the battery charge, and the vehicle speed; and produces digital signals to affect selection of drive mode, said control unit includes an electronic inverter to convert the direct current to a variable cycle alternating current for A.C. electric motor speed control.

2. The system according to claim 1 further includes a shock absorber system for damping the road shocks, and pressurizing a power fluid in a closed power circuit to actuate a power expander having an electric power generator to charge said battery, and drive said electric motor.

3. An apparatus to be employed in the combination of claim 1 for a hermetically sealed helical screw gas expander-liquid pump-electric power generator unit having a helical screw gas expander assembly, a positive displacement liquid pump assembly, and a direct current electric power generator assembly, all mounted on a common drive shaft and are disposed in a hermetically sealed enclosure comprising:

a helical screw gas expander assembly to affect expansion of a relatively high pressure gas to a relatively lower pressure level, simultaneously producing kinetic energy to drive a power shaft; said gas expander is characterized to have two intermeshing female helical screw driver rotor, with a male helical screw driven rotor, and has a spur gear drive to transmit the kinetic energy to a power shaft; the enclosure of said expander has a high pressure gas inlet which extends to outside the hermetically sealed enclosure, and has a low pressure outlet exhaust which discharges inside the hermetically sealed enclosure;

a liquid positive displacement helical gear pump assembly mounted on said power shaft, and characterized to have two intermeshing male and a female helical gears enclosed in a sealed enclosure which have a low pressure suction connection, and a high pressure discharge connected directly to outside said hermetically sealed enclosure;

a permanent magnet brushless D.C. electric power generator connected to said power shaft, said generator uses electronic commutation with electronic switching means that switches the voltage supplied from the winding leads in response to the rotor's position;

a hermetically sealed enclosure consists of welded shell to contain said gas expander-liquid pump-electric generator assembly, said enclosure has resilient support means, gas and liquid conduit connections, and electric generator power wiring terminal connections.

4. An apparatus to be employed in combination of claim 1 for a hermetically sealed reciprocating piston gas expander unit comprising:

a reciprocating piston gas expansion mechanism having one or more pistons, each piston is enclosed in a sealed cylinder, and is operatively connected to a power shaft through a connecting rod, and an eccentric or crank arm;

a liquid positive displacement helical gear pump assembly directly mounted on said power shaft, and characterized to have two intermeshing male and female gears enclosed in a sealed enclosure, and have a low pressure suction, and a high pressure discharge connections, directly connected to outside of said hermetically sealed enclosure;

a permanent magnet brushless D.C. electric power generator having a rotor fitted on said power shaft, and is commutated by electronic switching means that switches the voltage supplied from the stator coil winding leads in response to the rotor's position;

means to permit alternative release of high pressure gas intake, and low pressure gas exhaust in coordination with the position of the piston to affect synchronous actuation of the expander pistons to drive the power shaft;

a hermetically sealed enclosure consists of welded shell to contain said gas expander-liquid pump-electric generator assembly, said enclosure has resilient support means, gas and liquid conduit connections, and electric generator power wiring terminal connections.

5. A solid state programmable logic controller unit in combination with claim 1 by which a first mode connects said electric motor drive to said battery, and actuates a first clutch to the engage position, while simultaneously actuating a second clutch to the disengage position; when said control unit is set in second mode it disconnects the electric motor drive, and actuates the first clutch to the disengage position while simultaneously actuating a relay to the close position so as to electrically start the internal combustion engine and actuates the second clutch to the engaged position; said control unit is characterized to have solid state logic circuiting which permits selection of the best mode of operation depending on measuring and comparing values of analog electric signals with preset values for the speed of the vehicle and the battery charge level; said control unit has a time delay feature to prevent excessive switching between the two modes while the vehicle is in operation.

6. A rechargeable battery in combination with claim 1 or claim 5, which is electrically linked through said control unit to said electric motor, and is linked to said voltage regulators of said waste heat recovery electric generator, and said kinetic energy recovery electric generator; said electric battery is also linked through said control unit to actuate said clutches, relays, and is independently connected to other vehicle motor drives, accessories, lights, and controls.

* * * * *